US012790570B1

(12) United States Patent
Arkin et al.

(10) Patent No.: US 12,790,570 B1
(45) Date of Patent: Nov. 10, 2026

(54) DETERGENT SHEETS WITH ENHANCED CLEANING AND STAIN REMOVAL EFFICACY

(71) Applicant: Venus Laboratories, Inc., Cypress, CA (US)

(72) Inventors: Jenna L. Arkin, Long Beach, CA (US); Ryan K. Hood, Huntington Beach, CA (US); Johanna Sandoval, Ontario, CA (US); Marlene Raigoza, Montebello, CA (US); James W. Davis, Lacey, WA (US)

(73) Assignee: Venus Laboratories, Inc., Cypress, CA (US)

( * ) Notice: Subject to any disclaimer, the term of this patent is extended or adjusted under 35 U.S.C. 154(b) by 229 days.

(21) Appl. No.: 18/884,918

(22) Filed: Sep. 13, 2024

Related U.S. Application Data

(63) Continuation of application No. 18/415,418, filed on Jan. 17, 2024, now Pat. No. 12,091,639.

(51) Int. Cl.

| | |
|---|---|
| ***C11D 17/06*** | (2006.01) |
| ***C11D 1/66*** | (2006.01) |
| ***C11D 3/38*** | (2006.01) |
| ***C11D 3/386*** | (2006.01) |

(52) U.S. Cl.
CPC ................ *C11D 17/06* (2013.01); *C11D 1/66* (2013.01); *C11D 3/38* (2013.01); *C11D 3/38609* (2013.01); *C11D 2111/12* (2024.01); *C11D 2111/14* (2024.01)

(58) Field of Classification Search
CPC .... C11D 1/12; C11D 1/83; C11D 1/90; C11D 3/0068; C11D 3/32; C11D 3/386; C11D 3/38609; C11D 17/041; C11D 17/042; C11D 2111/12
See application file for complete search history.

(56) References Cited

U.S. PATENT DOCUMENTS

| | | | | |
|---|---|---|---|---|
| 3,857,732 | A | 12/1974 | Yoshino | |
| 2008/0139069 | A1 | 6/2008 | Chang et al. | |
| 2011/0154604 | A1 * | 6/2011 | Chang | A47L 13/16 15/244.4 |
| 2015/0159330 | A1 | 6/2015 | Weisman et al. | |
| 2016/0035569 | A1 | 2/2016 | Rumer et al. | |
| 2019/0055498 | A1 * | 2/2019 | Burgan | C11D 1/66 |
| 2020/0010784 | A1 * | 1/2020 | Cho | C11D 3/386 |
| 2022/0403301 | A1 * | 12/2022 | Soane | A01N 25/10 |

* cited by examiner

*Primary Examiner* — Charles I Boyer
(74) *Attorney, Agent, or Firm* — Knobbe, Martens, Olson & Bear LLP

(57) ABSTRACT

Provided herein are detergent compositions in solid sheet form that include a detergent component and activated charcoal dispersed in the detergent sheet. The activated charcoal is lightweight, porous and has high surface area to weight ratio. The detergent component and activated charcoal work synergistically to enhance cleaning and stain removal efficacy. The detergent compositions may be a laundry detergent sheet or a toilet bowl cleaner sheet.

20 Claims, 3 Drawing Sheets

Process 100
Solid Laundry Detergent Sheet Preparation Process

Process 200
Solid Laundry Detergent Sheet Preparation Process

DETERGENT SHEETS WITH ENHANCED CLEANING AND STAIN REMOVAL EFFICACY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 18/415,418, filed Jan. 17, 2024.

BACKGROUND

Field

This disclosure generally relates to laundry detergents and cleaning compositions in solid sheet form.

Description of Certain Related Art

Laundry detergent sheets are an eco-friendly alternative to traditional liquid and powder detergents. Detergents in sheet form are typically lightweight, compact, and convenient to use as they are pre-dosed and do not spill or break in transit. However, the cleaning and stain removal efficacy of detergent sheets may be limited by the high temperature process conditions required for sheet formation. Enzymes in the detergent are prone to denaturing in high heat during manufacturing, thus making it difficult to increase the cleaning and stain removal efficacy of detergent sheets.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The disclosure herein presents various embodiments of detergent compositions in sheet form having improved cleaning and stain removal efficacy. The detergent compositions can be in the form of laundry detergent sheets or toilet bowl cleaner sheets.

In some embodiments, the detergent composition generally comprises a detergent component bound and suspended by a water-soluble matrix in sheet form and preselected amounts of activated charcoal dispersed in the matrix. The water-soluble matrix is designed to release the detergent component and the activated charcoal when the water-soluble matrix contacts a sufficient volume of water. The activated charcoal can comprise lightweight, porous particulate carbon having high surface area to weight ratio. In some implementations, the activated charcoal can have an average surface area of at least 950 $m^2/g$ and a density of 55 $g/cm^3$ or less. In some implementations, the activated charcoal is 0.1%-25% by weight or 1%-5% by weight or 15%-25% by weight of the detergent composition. The detergent component can include ionic or non-ionic surfactants, enzymes, and/or other chemicals for cleaning and stain removal. In some implementations, the detergent composition comprises saponin. In some implementations, the water-soluble matrix of the detergent composition comprises a bio-based polymer such as hydroxyethyl cellulose. In some implementations, the detergent composition has no detectible amounts of polyvinyl alcohol. The detergent composition can be in the form of a laundry detergent sheet or a toilet bowl cleaner sheet.

In some embodiments, a laundry detergent sheet containing a detergent component and activated charcoal is provided. The detergent component and activated charcoal work synergistically to enhance cleaning and stain removal efficacy. The laundry detergent sheet can comprise 5%-25% by weight a highly porous charcoal capable of adsorbing odor-causing components. In some implementations, the activated charcoal has a density of less than 55 $g/cm^3$ and an average surface area of at least 950 $m^2/g$. The activated charcoal is dispersed in a water-soluble matrix in sufficient quantities to work synergistically with the detergent component to enhance the cleaning and stain removal efficacy of the detergent composition. In one embodiment, the laundry detergent sheet contains no detectable trace of polyvinyl alcohol. In one embodiment, the laundry detergent sheet comprises a bio-based polymer. In one embodiment, the bio-based polymer is hydroxyethyl cellulose. In one embodiment, the detergent component comprises saponin as surfactant.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
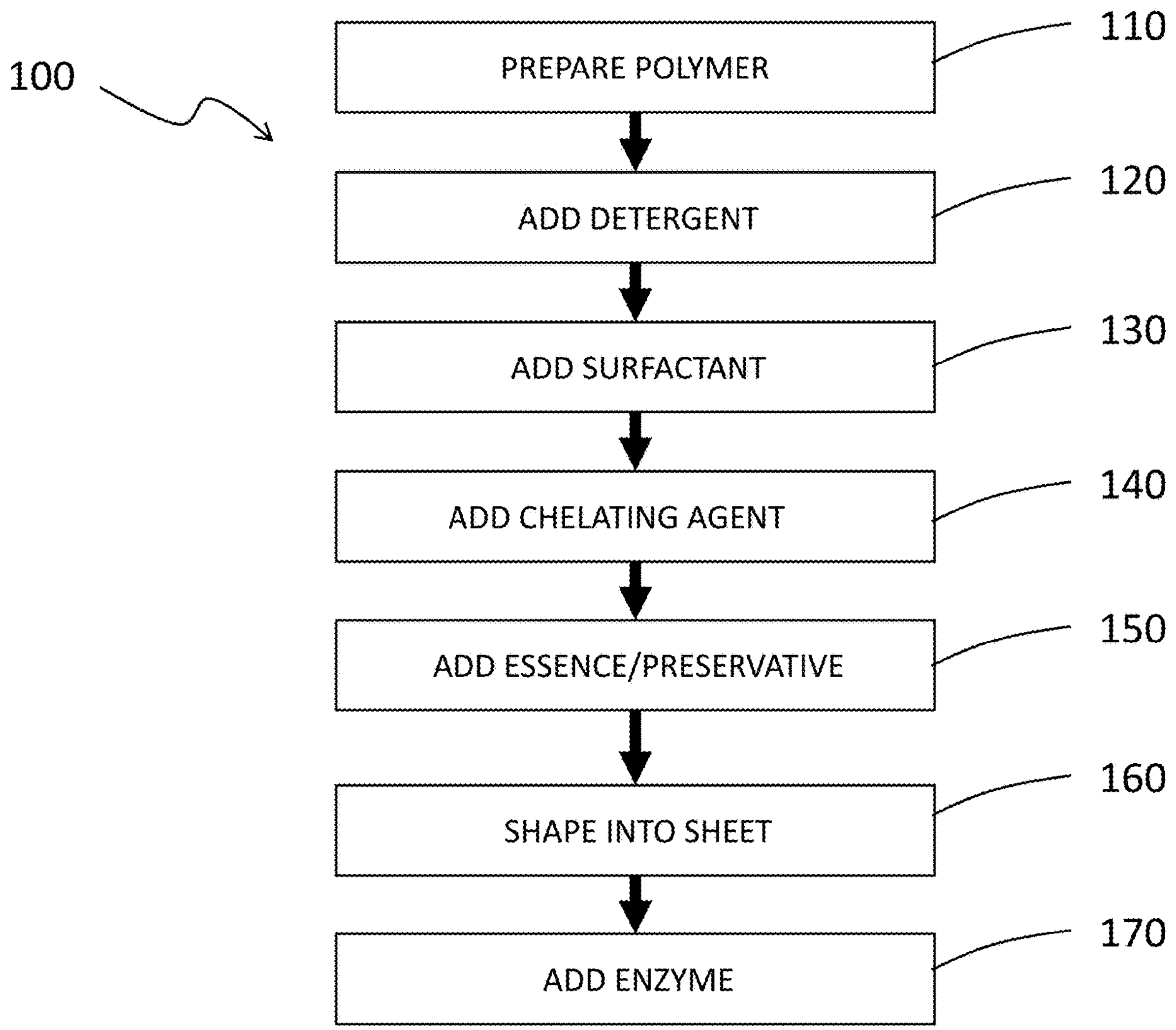
FIG. 1 is a flow diagram illustrating a method of making a laundry detergent sheet in accordance with certain embodiments of the present disclosure.

Embodiments of compositions, articles, and methods of manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The disclosure herein provides various embodiments of detergent compositions in solid sheet form with high cleaning and stain removal efficacy. The detergent compositions incorporate preselected amounts of activated charcoal, a lightweight particulate carbon with high porosity and surface area. In some embodiments, the detergent compositions can be in the form of a laundry detergent sheet or a toilet bowl cleaner sheet having embedded activated charcoal. In one embodiment, surface area of the activated charcoal is between 950 to 2000 $m^2/g$ or greater than 3000 $m^2/g$. In one embodiment, the density of the activated charcoal is between 45 $g/cm^3$ to 60 $g/cm^3$, or about 55 $g/cm^3$. In some implementations, the activated charcoal is derived from coconut shells.

Without wishing to be bound by theory, the inventors have found that activated charcoal or activated carbon when incorporated in detergent sheets described herein provides thermal stability and compensates for loss in cleaning efficacy due to denaturing or unfolding of enzymes that may occur during high temperature process conditions. The inventors have observed that activated charcoal improves the efficacy of stain and odor removal and brightening, along with scouring ability, improving the performance of the formulation. Activated charcoal incorporated in the detergent sheet composition is extremely porous and has high surface area to weight ratio and configured to adsorb a variety of different odor-causing molecules such as fat, grease or protein.

In some embodiments, the detergent sheets can be made of natural and earth-friendly ingredients, as discussed herein. The detergent sheets can be made of plant-based and mineral-based materials. The detergent sheets can include ingredients that are produced or processed without generating byproducts that are unsafe to humans or the environment. As discussed herein, the detergent sheets can be made of a mixture of detergents, surfactants, emulsifiers, thickening agents, anti-foaming agents, chelators, and enzymes, each of which can be made of natural ingredients. In some implementations, the detergent sheets include only negligible amounts of polyvinyl alcohol.

FIG. 1 depicts a non-limiting, illustrative method of making a detergent sheet of the present disclosure. As shown in FIG. 1, the method 100 can include a step 110 of mixing one or more polymers in a solvent (e.g., water) to form a polymer mixture. In some embodiments, the polymer can be polyvinyl alcohol ("PVA"). The PVA can be mixed in water. The PVA can be dissolved in heated water. In some embodiments, the PVA can be dissolved in water that is heated to a temperature of 80° C. In some embodiments, the PVA can be dissolved in water that is heated to a temperature between: 40° C. to 100° C.; 60° C. to 90° C.; 75° C. to 85° C. The amount of PVA added to the water can be chosen such that the finished detergent sheet has a PVA content (e.g., percent by weight) that is within a range of: 10% to 50%; 15% to 25%; 17% to 18%. In some formulations, the detergent sheet has a PVA content that is 17.5% by weight.

In certain embodiments, the polymer mixture is substantially free of fossil-fuel based carbon so that the detergent sheet contains no more than a negligible amount of fossil-fuel based carbon. In one embodiment, the polymer mixture is substantially free of PVA such that the detergent sheet contains no detectable amount of PVA.

In certain embodiments, the polymer mixture comprises a biopolymer, for example, a polysaccharide with linked sugar monomeric units. The biopolymer can provide certain functions that would be served by PVA. In further embodiments, the biopolymer can serve as a replacement to synthetic binders, such as PVA. In some embodiments, the polymer mixture can comprise one or more of the following biopolymers: hydroxyethyl cellulose; gum acacia; cellulose; *Zea mays* starch; *Oryza sativa* starch; sodium polyitaconate; a natural polymer solution; hydroxypropyl cellulose; tapioca starch; sodium alginate; sorbitol; pullulan; soy protein; pea protein, carrageenan, cellulose-based materials, brewer's spent grain, mung bean protein and poly(2-ethyl-2-oxazoline). In some embodiments, the polymer mixture includes at least one biopolymer in the amount of at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of the biopolymer present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

With continued reference to FIG. 1, the method 100 can include a step 120 of adding detergent ingredients to the polymer mixture. The detergent ingredients can include one or more ingredients such as sodium mono-C12-18 alkyl sulfate; sodium coconut oil sulfate; soapnut saponin; polyether modified polysiloxane) and dimethyl siloxane. In some embodiments, the detergent ingredients are added to the polymer mixture when the polymer mixture is at room temperature (e.g., 20° C.). In some embodiments, the detergent ingredients are added to a polymer mixture that has a temperature between: 20° C. to 100° C.; 60° C. to 90° C.; or 75° C. to 85° C. The polymer mixture can be stirred during the addition or after the addition of the detergent ingredients to disperse or dissolve the detergent ingredients within the polymer mixture.

The detergent ingredient sodium coconut oil sulfate can be irritating to the skin. Some countries have restrictions on the use of natural product ingredients such as sodium coconut oil sulfate. In some embodiments, the detergent sheet can be free of or have no detectable amount of sodium coconut oil sulfate. However, sodium coconut oil sulfate can provide emulsifying ability to a detergent composition and removal of sodium coconut oil sulfate from a detergent composition can result in insufficient emulsification of high-molecular polymer components of the composition, leading to a failure of the post-processing molding process of the detergent sheet. In some aspects, the detergent compositions of the present disclosure can achieve a synergistic mixture of ingredients that provide sufficient emulsification for molding the composition into a solid sheet detergent while maintaining a detergent formulation that is non-irritating and environmentally-friendly.

Sodium mono-C12-18 alkyl sulfate is less prone to cause irritation compared to sodium coconut oil sulfate. In some embodiments, the detergent sheets use high-content and low-irritation single sodium mono-C12-18 alkyl sulfate in place of sodium coconut oil sulfate. In other words, the detergent sheet can contain sodium mono-C12-18 alkyl sulfate and be free of sodium coconut oil sulfate. In at least one embodiment, the detergent composition replaces sodium coconut oil sulfate with a low irritation 30% single sodium mono-C12-18 alkyl sulfate and achieves sufficient emulsification by including a blend of natural, earth-friendly surfactants, as discussed herein.

The amount of sodium mono-C12-18 alkyl sulfate added to the polymer mixture can be chosen such that the finished detergent sheet has a sodium mono-C12-18 alkyl sulfate content (e.g., percent by weight) that is within a range of: 5% to 35%; 10% to 25%; or 18% to 19%. In some formulations, the detergent sheet has a sodium mono-C12-18 alkyl sulfate content that is 18.86% by weight. The amount of soapnut saponin added to the polymer mixture can be chosen such that the finished detergent sheet has a soapnut saponin content (e.g., percent by weight) that is within a range of: 0.2% to 20%; 1% to 10%; or 2% to 4%. In some formulations, the detergent sheet has a soapnut saponin content that is 3.018% by weight. The amount of polyether modified polysiloxane added to the polymer mixture can be chosen such that the detergent sheet has a polyether modified polysiloxane content (e.g., percent by weight) that is within a range of: 0.2% to 5%; 0.5% to 4%; or 1% to 2%. In some formulations, the detergent sheet has a polyether modified polysiloxane content that is 1.866% by weight. The amount of dimethyl siloxane added to the polymer mixture can be chosen such that the detergent sheet has a dimethyl siloxane content (e.g., percent by weight) that is within a range of: 0.1% to 5%; 0.2% to 1%; or 0.3% to 0.4%. In some formulations, the detergent sheet has a dimethyl siloxane content that is 0.377% by weight.

Turning again to FIG. 1, the method 100 can include the step 130 of adding surfactant ingredients to the polymer mixture. In some embodiments, a mixture of surfactants is used. The detergent sheet can be free of ethoxylated surfactants. In other words, the detergent sheet can contain no ethoxylated surfactants. Ethoxylated surfactants (e.g., sodium ethoxysulfate) can be used in detergent compositions. A problem with ethoxylated surfactants is that the production of these compounds can generate carcinogenic byproducts (e.g., dioxane). Some countries forbid the use of sodium ethoxysulfate in detergent products. In some embodiments, the detergent compositions of the present disclosure can be free of sodium ethoxysulfate.

Ethoxylated surfactants are mainly concentrated in nonionic surfactants although some are also anionic. Ethoxylated surfactants carry no charge when ionized in water, giving these surfactants an advantage over other surfactants in detergency. Exclusion of ethoxylated surfactants from a detergent sheet composition can result in insufficient emulsification and failure of the molding process, as discussed herein, and can result in a composition with insufficient detergency ability. The present disclosure provides blends of non-ethoxylated surfactants that achieve a sufficient emulsification to enable molding of the solid sheet while maintaining a safe, effective, and environmentally-friendly detergent composition. In some aspects, the presently-disclosed blends of non-ethoxylated surfactants have been unexpectedly found to provide detergent sheets that have sufficient emulsifying ability, a reduced amount of irritation, good sterilization ability, and good anti-static function. Without being bound to a particular theory for this finding, it is believed that the blends of natural non-ethoxylated surfactants disclosed herein work together to synergistically enhance foam bubble formation and stabilization.

In some embodiments, the detergent sheet can include one or more of a non-ionic surfactant, a zwitterionic surfactant, an anionic surfactant, and a plant-derived surfactant. The surfactant ingredients can include one or more ingredients such as alkyl glucoside, saponin, coco-glucoside, cocamidopropyl betaine, sodium coco-sulfate, sodium lauryl sulfate, coconut oil amide propyl oxide, and cocamidopropylamine oxide. In some embodiments, the surfactant ingredients are added to the polymer mixture when the polymer mixture is at room temperature (e.g., 20° C.). In some embodiments, the surfactant ingredients are added to a polymer mixture that has a temperature between: 20° C. to 100° C.; 60° C. to 90° C.; or 75° C. to 85° C. The polymer mixture can be stirred during or after the addition of the surfactant ingredients (or any of the other ingredients disclosed herein) to disperse or dissolve the ingredients within the polymer mixture.

Alkyl propyl oxide is a non-ionic surfactant that can replace the use of ethoxylated surfactants in the detergent sheet composition while maintaining a sufficient detergency of the formulation. The amount of alkyl glucoside added to the polymer mixture can be chosen such that the finished solid detergent sheet has an alkyl glucoside content (e.g., percent by weight) that is within a range of: 0.2% to 25%; 5% to 15%; or 9% to 10%. In some embodiments, the detergent sheet has an alkyl glucoside content that is 9.43% by weight. The amount of cocamidopropyl betaine added to the polymer mixture can be chosen such that the finished detergent sheet has a cocamidopropyl betaine content (e.g., percent by weight) that is within a range of: 0.5% to 25%; 1% to 10%; or 5% to 6%. In some formulations, the detergent sheet has a cocamidopropyl betaine content that is 5.66% by weight. The amount of coconut oil amide propyl oxide added to the polymer mixture can be chosen such that the finished detergent sheet has a coconut oil amide propyl oxide content (e.g., percent by weight) that is within a range of: 0.5% to 20%; 1% to 10%; or 3% to 4%. In some formulations, the detergent sheet has a coconut oil amide propyl oxide content that is 3.772% by weight. The amount of cocamidopropylamine oxide added to the polymer mixture can be chosen such that the finished detergent sheet has a cocamidopropylamine oxide content (e.g., percent by weight) that is within a range of: 0.5% to 20%; 1% to 10%; or 3% to 4%. In some formulations, the detergent sheet has a cocamidopropylamine oxide content that is 3.772% by weight. The blend of alkyl polyglucoside (9.43%), cocamidopropyl betaine (5.66%), and coconut oil amide propyl oxide (3.77%) has been found to provide a detergent sheet with excellent antistatic function, good emulsification, good dispersibility, and good biodegradability.

In some embodiments, the detergent compositions can include an anti-foaming agent. The anti-foaming agent can be added to the polymer mixture before or after the addition of the surfactants. In one embodiment, the anti-foaming agent is added along with the surfactants, as described below. The detergent sheet can include a mineral-based anti-foaming agent. In some embodiments, the detergent sheet can include an anti-foaming agent such as polyether modified polysiloxane and dimethyl siloxane. The amount of polyether modified polysiloxane added to the polymer mixture can be chosen such that the finished detergent sheet has a polyether modified polysiloxane content (e.g., percent by weight) that is within a range of: 0.2% to 5%; 0.5% to 3%; or 1% to 2%. In some embodiments, the detergent sheet has a polyether modified polysiloxane content that is 1.866% by weight. The amount of dimethyl siloxane added to the polymer mixture can be chosen such that the finished detergent sheet has a dimethyl siloxane content (e.g., percent by weight) that is within a range of: 0.1% to 5%; 0.2% to 1%; or 0.3% to 0.4%. In some formulations, the detergent sheet has a dimethyl siloxane content that is 0.377% by weight.

In some embodiments, the detergent compositions can include one or more of silicon dioxide; glycerol; and water. The amount of silicon dioxide added to the polymer mixture can be chosen such that the finished detergent sheet has a silicon dioxide content (e.g., percent by weight) that is within a range of: 0.5% to 10%; 2% to 8%; or 5% to 6%. In some implementations, the detergent sheet has a silicon dioxide content that is 5.66% by weight. The amount of glycerol added to the polymer mixture can be chosen such that the finished detergent sheet has a glycerol content (e.g., percent by weight) that is within a range of: 0.5% to 10%; 2% to 8%; or 5% to 6%. In some formulations, the detergent sheet has a glycerol content that is 1.886% by weight. The amount of water added to the polymer mixture can be chosen such that the finished detergent sheet has a water content (e.g., percent by weight) that is within a range of: 5% to 40%; 6% to 10%; or 7% to 8%. In some embodiments, the detergent sheet has a water content that is 7.372% by weight.

With reference again to FIG. 1, the method 100 can include the step 140 of adding one or more chelating agent ingredients to the polymer mixture. The detergent compositions can include a zeolite as a chelating agent. In some embodiments, the detergent compositions can include kaolin. The amount of kaolin added to the polymer mixture can be chosen such that the finished detergent sheet has a kaolin content (e.g., percent by weight) that is within a range of: 1% to 35%; 15% to 25%; or 20% to 21%. In some formulations, the detergent sheet has a kaolin content that is 20.75% by weight.

The method 100 can include the step 150 of adding chelating agent, pH buffers, fragrance and preservative to the polymer mixture. The formulation can include one or more ingredients such as sodium citrate; potassium sorbate; lemongrass oil; and citric acid. In some aspects, the amount of sodium citrate added to the polymer mixture can be chosen such that the finished detergent sheet has a sodium citrate content (e.g., percent by weight) that is within a range of: 0.2% to 5%; 0.5% to 3%; or 1% to 2%. In some embodiments, the detergent sheet has a sodium citrate content that is 1.866% by weight. In some embodiments, the amount of potassium sorbate added to the polymer mixture can be chosen such that the finished detergent sheet has a potassium sorbate content (e.g., percent by weight) that is within a range of: 0.2% to 2%; 0.3% to 1%; or 0.5% to 0.6%. In some embodiments, the solid sheet detergent has a potassium sorbate content that is 0.566% by weight. In some embodiments, the amount of lemongrass oil added to the polymer mixture can be chosen such that the finished detergent sheet has a lemongrass oil content (e.g., percent by weight) that is within a range of: 0.2% to 5%; 0.3% to 1%; or 0.4% to 0.6%. In some embodiments, the detergent sheet has a lemongrass oil content that is 0.5% by weight. In some embodiments, the amount of citric acid added to the polymer mixture can be chosen such that the finished detergent sheet has a citric acid content (e.g., percent by weight) that is within a range of: 0.1% to 2%; 0.2% to 1%; or 0.3% to 0.4%. In some embodiments, the detergent sheet can have a citric acid content that is 0.377% by weight.

In some embodiments, particles of activated charcoal (or activated carbon) are suspended in the detergent sheet. In certain embodiments, the activated charcoal may be a charcoal powder, such as vegetable carbon. The amount of activated charcoal added to the polymer mixture can be chosen such that the finished detergent sheet has an activated charcoal content (e.g., percent by weight) that is within a range of: 0.1% to 25%; 1% to 15%; or 5% to 10%. In some embodiments, the amount of activated charcoal in the composition may be, for example, at least about 0.5 wt. %, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least about 11 wt. %, at least about 12 wt. %, at least about 13 wt. %, at least about 14 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, or within a range defined by any two of the aforementioned concentrations. In some embodiments, the detergent sheet has an activated carbon content that is 7% by weight.

The method 100 can include the step 160 of shaping the polymer mixture to make a unitary piece. The shaping can be done at room temperature (e.g., 20° C.). In some embodiments, the shaping is performed a temperature between: 10° C. to 100° C.; 60° C. to 90° C.; or 75° C. to 85° C. The shaping can be done at atmospheric pressure. In some embodiments, the shaping is performed at a pressure below atmospheric pressure. In some embodiments, the shaping is performed at a pressure above atmospheric pressure. In some embodiments, the shaping is performed at a pressure below atmospheric pressure to form a cell structure (e.g., open-cell foam, closed-cell foam) within the detergent sheet In some embodiments, the shaping is performed at a pressure above atmospheric pressure to avoid the formation of a cell structure (e.g., open-cell foam, closed-cell foam) within the detergent sheet.

The method 100 can include the step 170 of adding an enzyme preparation to the formed unitary piece. In some embodiments, the enzyme can be subtilisin protease, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, B-glucanases, arabinosidases, hyaluronidase, chondroitinase, laccase, and amylases, and combinations thereof. In one embodiment, the detergent sheet can include protease. The amount of protease added to the polymer mixture can be chosen such that the finished detergent sheet has a protease content (e.g., percent by weight) that is within a range of: 0.2% to 5%; 0.3% to 1%; or 0.4% to 0.6%. In some formulations, the detergent sheet has a protease content that is 0.5% by weight.

In some embodiments, the enzyme preparation can enhance the decontamination ability of the detergent sheet. A problem with including enzyme preparations in detergents is that the activity of the enzyme preparation can be offset or inactivated by contact of the enzyme with preservatives and other ingredients in the detergent formulation. In some embodiments, the enzyme components of the detergent composition can be added at room temperature after the detergent sheet is formed. Adding the enzyme preparations to the detergent sheet has been found to reduce this offset phenomenon, allowing the enzyme preparation to provide a more stable and effective role in decontamination.

In some embodiments, the aforementioned ingredients of the detergent sheet can be added individually and dispersed in the polymer mixture before the next ingredient is added to the polymer mixture. For example, the detergent ingredients can be added to the polymer mixture and dispersed in the polymer mixture before the surfactant ingredients are added to the detergent-containing polymer mixture. In some embodiments, the detergent ingredients, the surfactant ingredients, the chelating agent ingredients, and the fragrance, chelating, buffering, and pH adjusters and preservative can be added all together to the polymer mixture or separately in an order other than shown in FIG. 1. In some embodiments, two or more of the ingredients can be added together while other ingredients can be added individually to the polymer mixture. For example, the detergent and chelating agent ingredients can be added together to the polymer mixture, dispersed throughout the polymer mixture, and then the chelating agent is added and dispersed, and then the essence and preservative are added to the polymer mixture.

Figure 2:
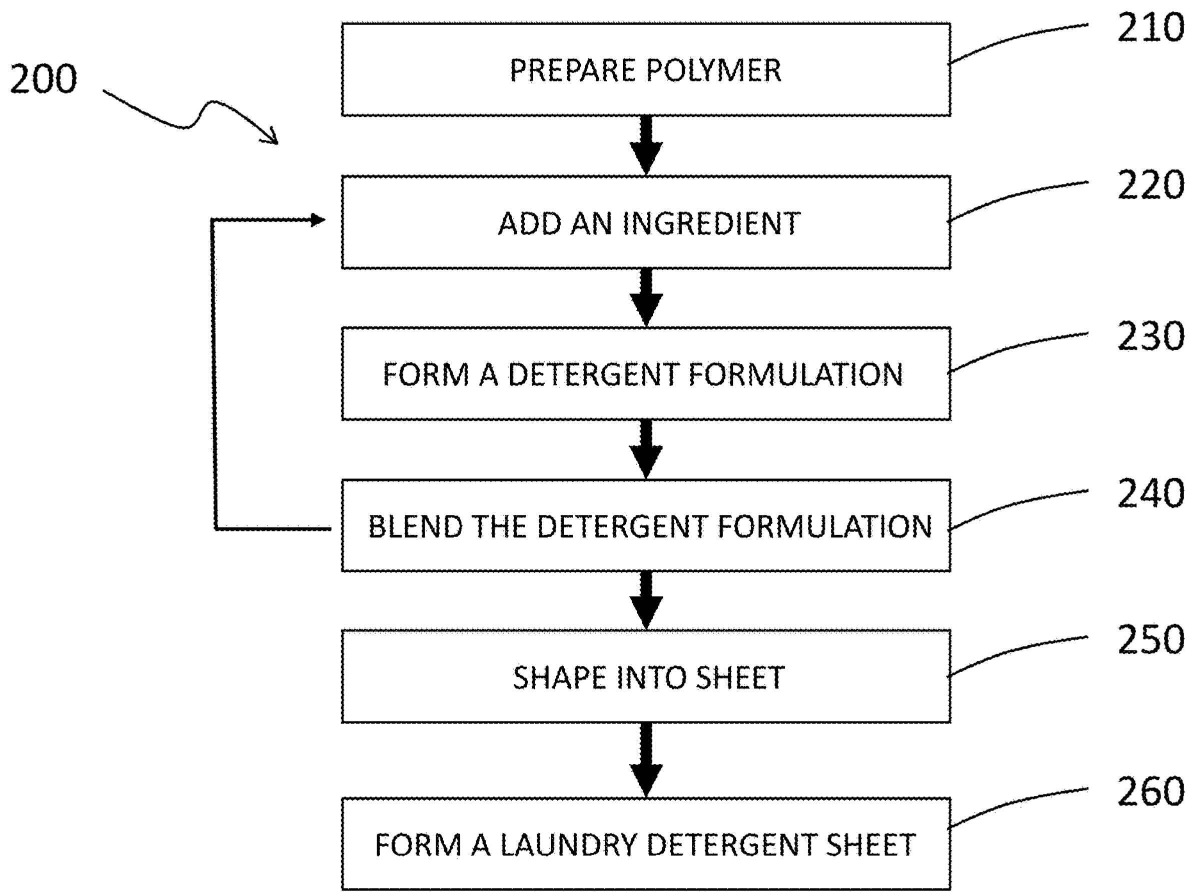
FIG. 2 is a flow diagram illustrating a method of making a laundry detergent sheet in accordance with certain embodiments of the present disclosure.

Further, FIG. 2 depicts another non-limiting, illustrative method of making a solid sheet laundry detergent of the present disclosure. As shown in FIG. 2, the method 200 can include a step 210 of mixing one or more polymers in a solvent (e.g., water) to form a polymer mixture. The method 200 can include a step 220 of adding at least one ingredient to the polymer mixture to form a detergent composition 230. The method 200 further includes a step 240 of blending the detergent composition. In addition, the method 200 can include shaping the detergent formulation into the form of a sheet 250 to form a laundry detergent sheet 260.

In some embodiments, blending the detergent compositions can be performed at a temperature of, of about, of at least, or of at least about, 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 55° C., 60° C., 65° C., 70° C., 75° C., 80° C., 85° C., 90° C., 95° C., or 100° C., or any range of values therebetween. For example, in some embodiments, blending the detergent compositions can be performed at a temperature of or of about in any one of the following ranges: 20° C.-50° C., 20° C.-29° C., or 30° C.-50° C.

In some embodiments, shaping the detergent composition into the form of a sheet can be performed at a temperature of, of about, of at least, or of at least about, 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 55° C., 60° C., 65° C., 70° C., 75° C., 80° C., 85° C., 90° C., 95° C., or 100° C., or any range of values therebetween. For example, in some embodiments, shaping the detergent composition into the form of a sheet can be performed at a temperature of or of about in any one of the following ranges: 20° C.-50° C., 20° C.-29° C., or 30° C.-50° C.

As described in the present application, the at least one ingredient can be selected from the group consisting of a detergent, a surfactant, a chelating agent, a preservative, and an enzyme, and combinations thereof. For example, in some embodiments, the detergent formulation can comprise at least one detergent, surfactant, chelating agent, preservative, and enzyme. In some embodiments, the detergent formulation can comprise a detergent. In some embodiments, the detergent formulation can comprise a surfactant. In some embodiments, the detergent formulation can comprise a chelating agent. In some embodiments, the detergent formulation can comprise a preservative. In some embodiments, the preservative can comprise activated carbon. In some embodiments, the detergent formulation can comprise an enzyme. In some embodiments, the enzyme can be selected from the group consisting of subtilisin protease, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, B-glucanases, arabinosidases, hyaluronidase, chondroitinase, laccase, and amylases, and combinations thereof.

In some embodiments, a second ingredient can be added after forming the detergent composition. In some embodiments, a second ingredient can be added after blending the detergent composition. In some embodiments, the enzyme is added to the polymer mixture before shaping the detergent composition into the form of a sheet. In some embodiments, the enzyme is added to the polymer mixture after shaping the detergent composition into the form of a sheet. In some embodiments, the preservative is added to the polymer mixture before the enzyme is added to the polymer mixture. In some embodiments, the preservative is added to the polymer mixture after the enzyme is added to the polymer mixture.

Figure 3:
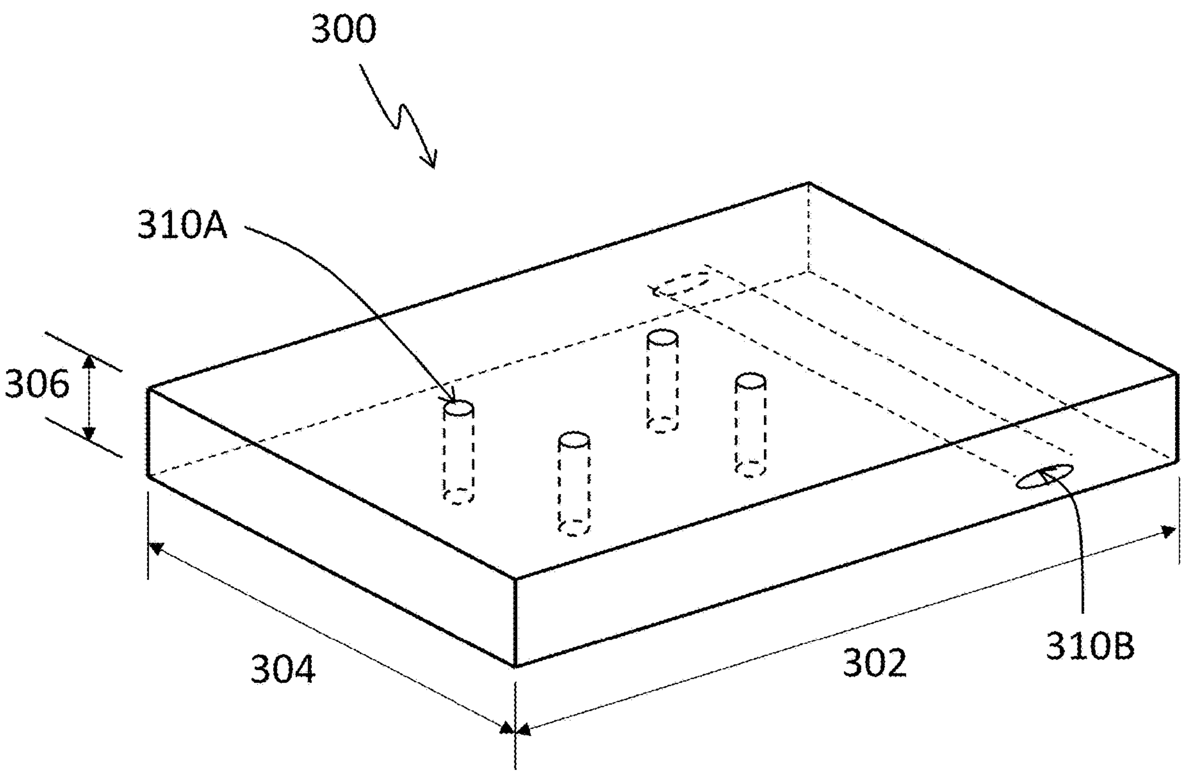
FIG. 3 is a schematic illustration of an embodiment of a laundry detergent sheet incorporating activated charcoal in accordance with certain embodiments of the present disclosure.

FIG. 3 shows a schematic illustration of a detergent sheet 300. In the illustrated embodiment, the detergent sheet 300 is configured as a rectangular prism. In some embodiments, the detergent sheet 300 can have a shape other than a rectangular prism (e.g., a disc). The detergent sheet 300 can have a length 302, a width 304, and a thickness 306, as shown. In some aspects, the detergent sheet 300 can be formed by pouring into a tray or mold a liquid slurry of the polymer mixture that includes the aforementioned solid sheet formulation ingredients. The slurry can be allowed to solidify. As shown in FIG. 3, the detergent sheet 300 can include one or more perforations 310A, 310B that can enhance the solubility of the detergent sheet 300. In the illustrated embodiment, the detergent sheet 300 has a plurality of first perforations 310A that span the thickness 306 of the detergent sheet 300. The detergent sheet 300 can include one or more second perforations 310B that span the width 304 of the detergent sheet 300. While not shown for the sake of clarity, the detergent sheet 300 can also include one or more perforations that span the length 302 of the detergent sheet 300. The perforations 310A, 310B can provide pathways for water to access the interior portions of the detergent sheet 300, thereby increasing the surface area of the detergent sheet that comes into contact with water. In some aspects, the perforations 310A, 310B can provide surface area for the enzyme preparation to bind to the detergent sheet 300 after the detergent sheet 300 is formed, as discussed herein. In some embodiments, the detergent sheet can be a laundry detergent sheet or toilet bowl cleaner sheet.

Example 1: Solid Sheet Detergent Formulation

Table 1 provides an illustrative composition of the detergent sheet. The components are presented in Table 1 as percent weight of the finished product, after the detergent sheet 300 has been molded and dried.

TABLE 1

| Content of a non-limiting detergent sheet. | |
|---|---|
| Ingredient | Amount (% weight) |
| Kaolin | 10-25% |
| Sodium mono-C12-18 alkyl sulfate | 10-25% |
| Polyvinyl alcohol (PVA) | 10-25% |
| Alkyl glucoside | 5-15% |
| Activated charcoal | 5-25% |
| Water | 5-15% |
| Silicon dioxide | 1-10% |
| Cocamidopropyl betaine | 1-10% |
| Coconut oil amid propyl oxide | 1-10% |
| Soapnut saponin | 1-10% |
| Glycerol | 1-10% |
| Polyether modified polysiloxane | 1-10% |
| Sodium citrate | 1-10% |
| Potassium sorbate | 0.1-2.0% |
| Lemongrass oil | 0.1-2.0% |
| Protease | 0.1-2.0% |
| Citric acid | 0.1-2.0% |
| Dimethyl siloxane | 0.1-2.0% |

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. Furthermore, where the terms "and" and "or" are used in conjunction with a list of items, they are to be interpreted broadly, in that any one or more of the listed items may be used alone or in combination with other listed items.

What is claimed is:

1. A detergent sheet comprising:

a water-soluble matrix in sheet form, the water-soluble matrix comprising a solidified polymer mixture;

a detergent component bound and suspended by the water-soluble matrix, the detergent component comprising kaolin, surfactants, and enzymes wherein the enzymes are selected to break down certain molecules on soiled material;

activated charcoal, the activated charcoal comprising particulate carbon having a porous exterior surface and a density of 55 g/cm$^3$ or less, wherein the activated charcoal is embedded in the water-soluble matrix; and wherein the water-soluble matrix is configured to release the detergent component and the activated charcoal when the water-soluble matrix contacts a sufficient volume of water such that the porous exterior surface of the activated charcoal adsorbs at least some of the molecules broken down by the enzymes.

2. The detergent sheet of claim 1, wherein the detergent component comprises 0.2-5 wt. % enzymes wherein the enzymes are selected to break down certain molecules on soiled laundry.

3. The detergent sheet of claim 2, wherein the enzymes comprise hemicellulase.

4. The detergent sheet of claim 2, wherein the enzymes comprise protease.

5. The detergent sheet of claim 1, wherein the activated charcoal is derived from coconut.

6. The detergent sheet of claim 1, wherein the detergent component further comprises sodium coconut oil sulfate.

7. The detergent sheet of claim 1, wherein the detergent component further comprises sodium mono-C12-18 alkyl sulfate.

8. The detergent sheet of claim 1, wherein the solidified polymer mixture comprises a biopolymer.

9. The detergent sheet of claim 8, wherein the detergent sheet comprises approximately 16-23 wt. % biopolymer.

10. The detergent sheet of claim 8, wherein the biopolymer comprises cellulose.

11. The detergent sheet of claim 8, wherein the biopolymer comprises hydroxyethyl cellulose.

12. The detergent sheet of claim 11, wherein the soiled material comprises soiled fabric.

13. The detergent sheet of claim 1, wherein the surfactants comprise plant-derived surfactant.

14. The detergent sheet of claim 13, wherein the plant-derived surfactant is soapnut saponin.

15. The detergent sheet of claim 1, wherein the detergent sheet comprises 0.1-25 wt. % activated charcoal.

16. The detergent sheet of claim 1, wherein the activated charcoal has an average surface area of at least 950 $m^2/g$.

17. The detergent sheet of claim 1, wherein the detergent sheet contains no detectable amounts of ethoxylated surfactants.

18. The detergent sheet of claim 1, wherein the detergent component comprises a blend of alkyl polyglucoside, cocamidopropyl betaine, and coconut oil amide propyl oxide.

19. A method for preparing the laundry detergent sheet of claim 1, comprising: mixing one or more polymers in a solvent to form a polymer mixture; adding a detergent component and activated charcoal to the polymer mixture to form a detergent composition; blending the detergent composition; and shaping the detergent composition into the form of a sheet.

20. The method of claim 19, further comprising adding an enzyme preparation after shaping the detergent composition into the form of a sheet.

* * * * *